(12) United States Patent
Murase (10) Patent No.: US 6,973,986 B2
(45) Date of Patent: Dec. 13, 2005

(54) BATTERY-POWERED VEHICLE

(75) Inventor: Takashi Murase, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 560 days.

(21) Appl. No.: 10/165,113

(22) Filed: Jun. 6, 2002

(65) Prior Publication Data

US 2002/0185320 A1 Dec. 12, 2002

(30) Foreign Application Priority Data

Jun. 7, 2001 (JP) .............................. 2001-171965

(51) Int. Cl.[7] ............................................ B60R 16/04
(52) U.S. Cl. .................................................. 180/68.5
(58) Field of Search .............................. 180/65.1, 68.5; 187/222; 280/43.12; 414/631

(56) References Cited

U.S. PATENT DOCUMENTS

| 3,721,353 | A | * | 3/1973 | Erickson | 180/68.5 |
| 4,173,264 | A | * | 11/1979 | Erker et al. | 180/68.5 |
| 4,342,470 | A | * | 8/1982 | Matsuda | 280/785 |
| 2003/0066560 | A1 | * | 4/2003 | Frazier | 137/312 |

FOREIGN PATENT DOCUMENTS

| JP | 8-310449 | * | 11/1996 |
| JP | 9-2080 | * | 1/1997 |
| JP | 9-77487 | * | 3/1997 |
| JP | 10-36089 | * | 2/1998 |
| JP | 2001-213593 | * | 8/2001 |
| JP | 2002-50332 | * | 2/2002 |

* cited by examiner

*Primary Examiner*—Bryan Fischmann
(74) *Attorney, Agent, or Firm*—Morgan & Finnegan, LLP

(57) ABSTRACT

A battery-powered vehicle has a pair of side frames, a cross plate, a pair of dams, a cover plate and a battery. The cross plate interconnects the side frames. The dam is provided on each of the side frames. The cover plate is arranged to overpass the dams. The battery is installed on the cover plate or above the cover plate.

19 Claims, 6 Drawing Sheets

BATTERY-POWERED VEHICLE

BACKGROUND OF THE INVENTION

The present invention relates to a battery-powered vehicle and more particularly to a battery-powered vehicle providing a structure for guiding leaked battery fluid toward the outside of the vehicle.

In a battery-powered vehicle, battery fluid, which is dilute sulfuric acid, possibly overflows out of a battery casing due to a boil upon charging the battery. For example, in a battery-powered forklift truck, mechanisms for driving, various kinds of control units and hydraulic equipments are arranged below the battery. Therefore, the leaked battery fluid may flow onto the above-mentioned units and equipment, and may damage them.

Figure 5:
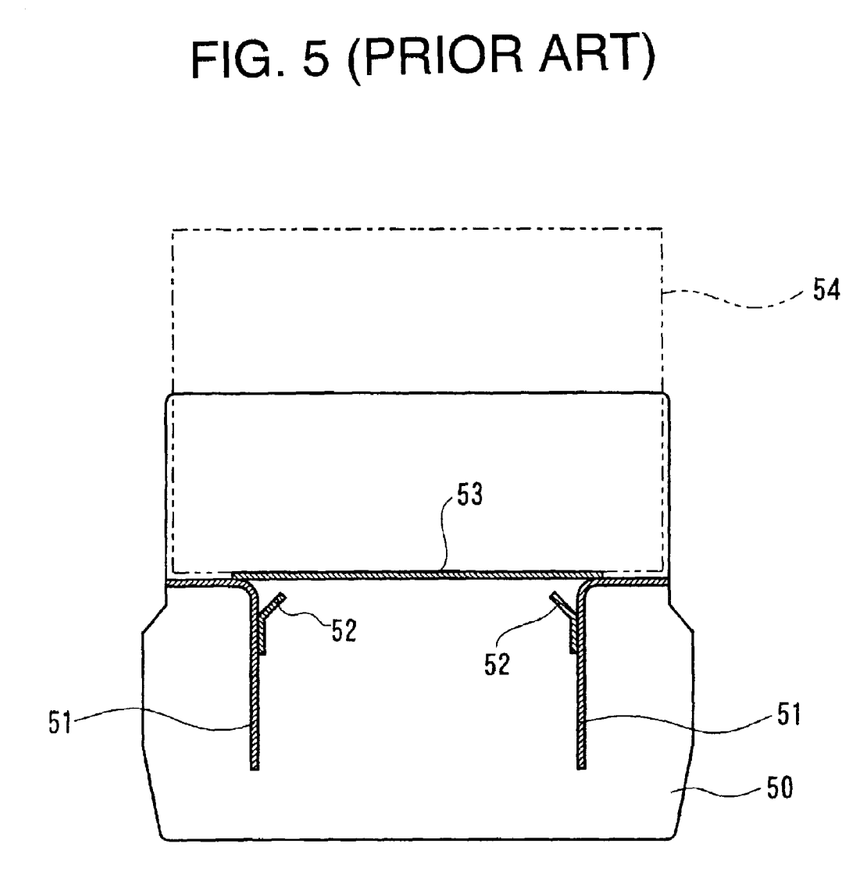
FIG. 5 is a schematic cross-sectional end view of a body of a conventional battery-powered forklift truck.
Figure 6:
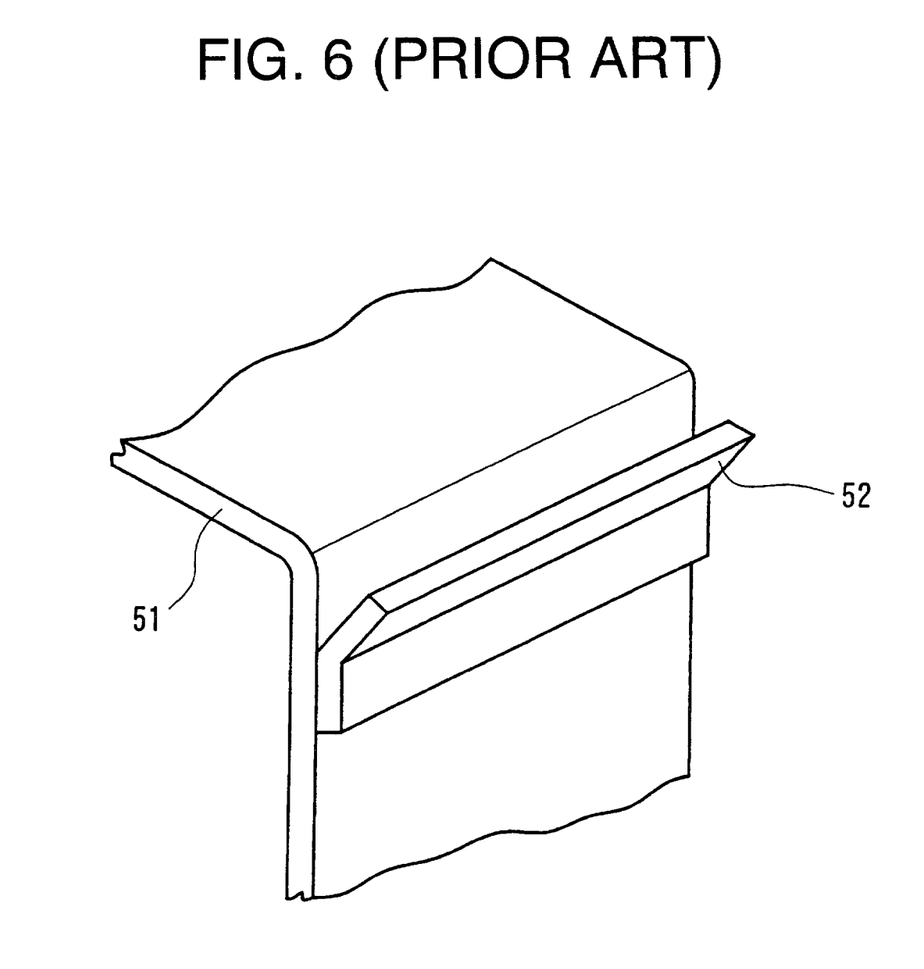
FIG. 6 is an enlarged partially perspective view of a conventional guide portion.

Therefore, a prior art shown in FIGS. 5 and 6 has been proposed and also has been practiced. In the prior art, a pair of right and left side frames 51 are interconnected by a cross plate 50. Each of the inner surfaces of the side frames 51 provides a guide portion 52. An under plate 53 is arranged on the side frames 51 so as to overpass a space between the side frames 51. A battery 54 including a plurality of cells in its casing is installed on the under plate 53.

Battery fluid leaked out of each of the cells flows onto the under plate 53 through a drain port, which is bored through the bottom of the battery casing, and flows toward right and left sides along the under plate 53, and then flows onto the side frames 51 out of the right and left peripheries of the under plate 53. Some battery fluid passes through gaps between the under plate 53 and the side frames 51. The guide portions 52, which form V-shaped grooves with the side frames 51, receive the battery fluid flowed thereon, and guide the battery fluid in front and rear directions of the vehicle. Thereby, the leaked battery fluid is drained toward the outside of the body out of positions, where the units and equipment accommodated between the side frames 51 are not damaged.

In the prior art, an unwanted effect is that a space for arranging the guide portions 52 are limited to a relatively small space to avoid an interference with the units and equipment accommodated between the side frames 51. Also, in a manufacturing process, since continuous welding is required of the guide portions 52 to inhibit the battery fluid from leaking therethrough, time and process of manufacturing increase, with a consequence of hindering cost from reducing.

SUMMARY OF THE INVENTION

The present invention addresses the above-mentioned problems by improving a structure of a vehicle.

The present invention provides a battery-powered vehicle has a pair of side frames, a cross plate, a dam, a cover plate and a battery. The cross plate interconnects the side frames. The dam is provided on each of the side frames. The cover plate is arranged to overpass the dams. The battery is installed on the cover plate or above the cover plate.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

An embodiment of the present invention will now be described with reference to FIGS. 1 to 4. The left side and the right side of FIGS. 1 and 2 correspond to the front side and the rear side, respectively. The present invention is applied to a battery-powered vehicle and particularly to a battery-powered forklift truck in the present embodiment.

Figure 1:
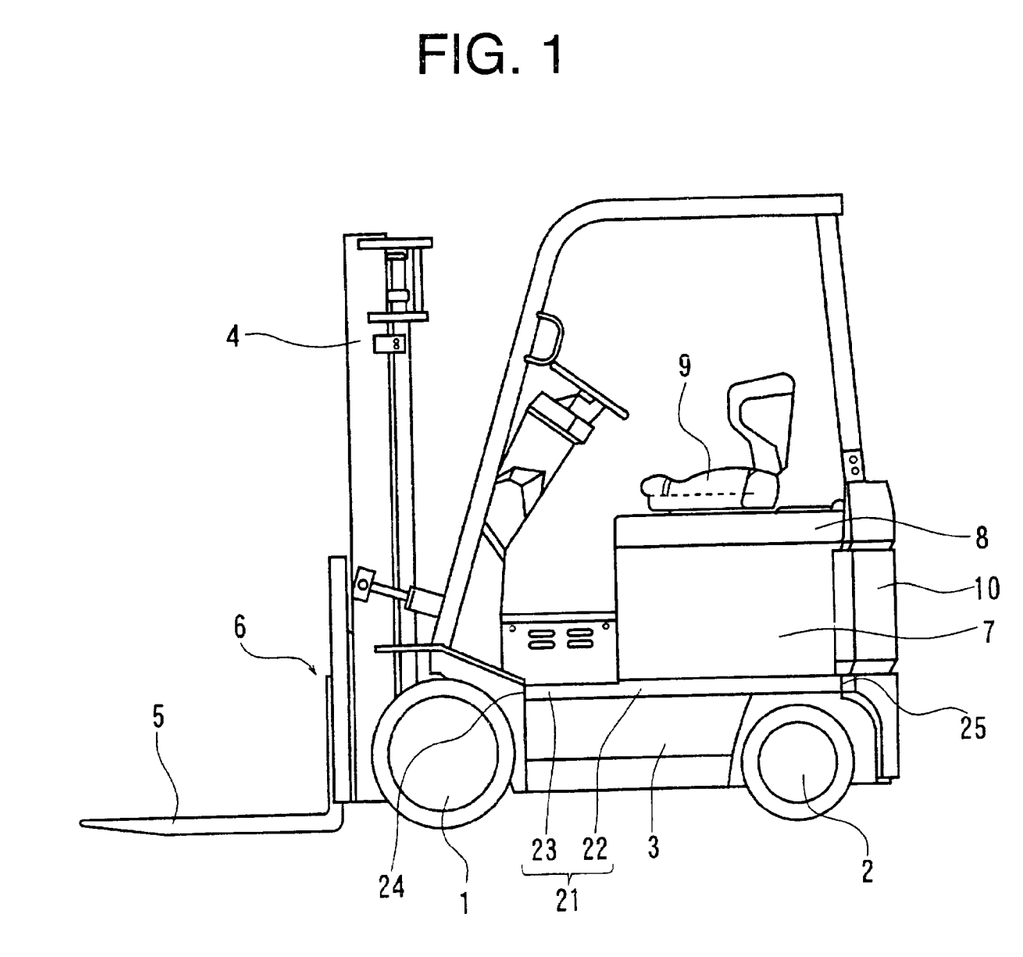
FIG. 1 is a side view of a whole battery-powered forklift truck according to an embodiment of the present invention.

As shown in FIG. 1, a pair of masts 4 is installed at the front of a body 3 of the forklift truck. The body 3 is supported by a pair of front wheels 1 and a pair of rear wheels 2. A loading apparatus 6 having forks 5 engages with the masts 4 so as to move up and down. Also, a battery 7 is installed in the body 3. An operator's seat 9 is fixed on a hood 8, which is arranged over the battery 7. Besides, a counter weight 10 is arranged at the rear of the body 3.

Figure 2:
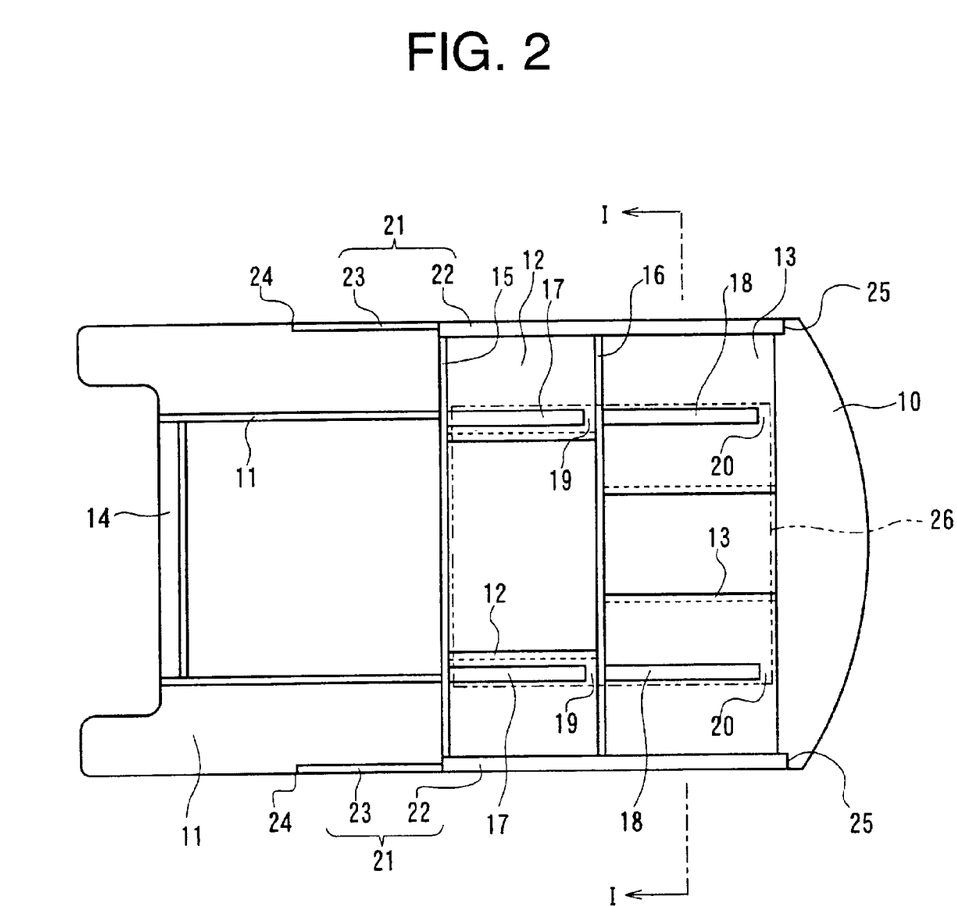
FIG. 2 is a schematic plan view of a body of the battery-powered forklift truck according to the embodiment of the present invention.
Figure 3:
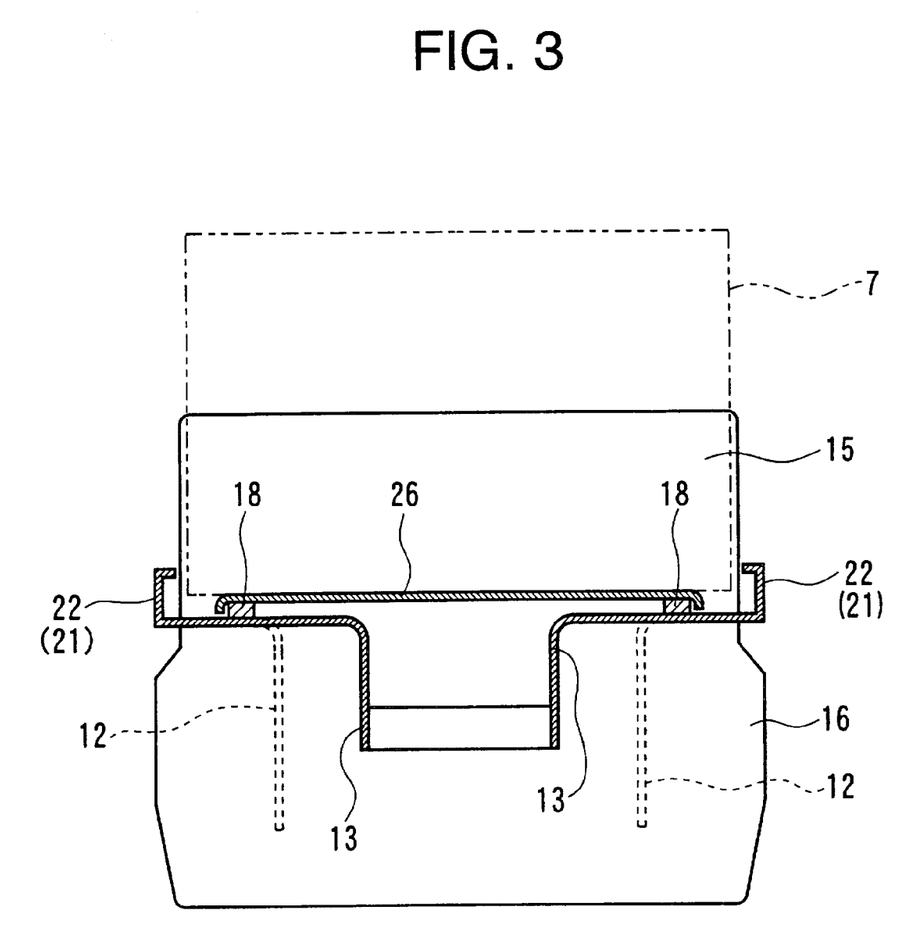
FIG. 3 is a cross-sectional view, taken along the line I—I in FIG. 2.

As shown in FIGS. 2 and 3, three pairs of side frames 11, 12, 13 are interconnected by cross plates 14, 15, 16, respectively. Thereby, the body 3 is constructed. The upper surfaces of pairs of the side frames 12, 13 provide pairs of dams 17, 18 with an appropriate height, and the pairs of dams 17, 18 extend in parallel with a direction in which the side frames 11, 12, 13 extend. In FIG. 2, the dams 17, 18 are formed by welding square bars to the side frames 12, 13, respectively, and clearances 19, 20 are defined between the rear ends of the dams 17 and the cross plate 16, and between the rear ends of the dams 18 and the counter weight 10, respectively. Actually, the clearances 19, 20 are occupied by build-up welding, and the pairs of dams 17, 18 are continuously formed, respectively. The pairs of dams 17, 18 may integrally be formed without dividing each of the dams into two pieces, so that the dams may extend from the cross plate 15 to the counter weight 10.

The pairs of side frames 11, 12, 13 each provides a pair of substantially horizontal troughs 21 along the outer side peripheries of the side frames 11, 12, 13 in the direction in which the side frames 11, 12, 13 extend. The troughs 21 respectively form semi-covered troughs 22, the cross sections of which are hook-shaped, at the side frames 12, 13. The troughs 21 also respectively form open troughs 23, the cross sections of which are L-shaped, at the side frames 11. The front ends 24 of the troughs 21 extend to tire housings of the front wheels 1, and open to the tire housings, respectively. The rear ends 25 of the troughs 21 extend to the tire housings of the rear wheels 2, and open to the tire housings, respectively.

Figure 4:
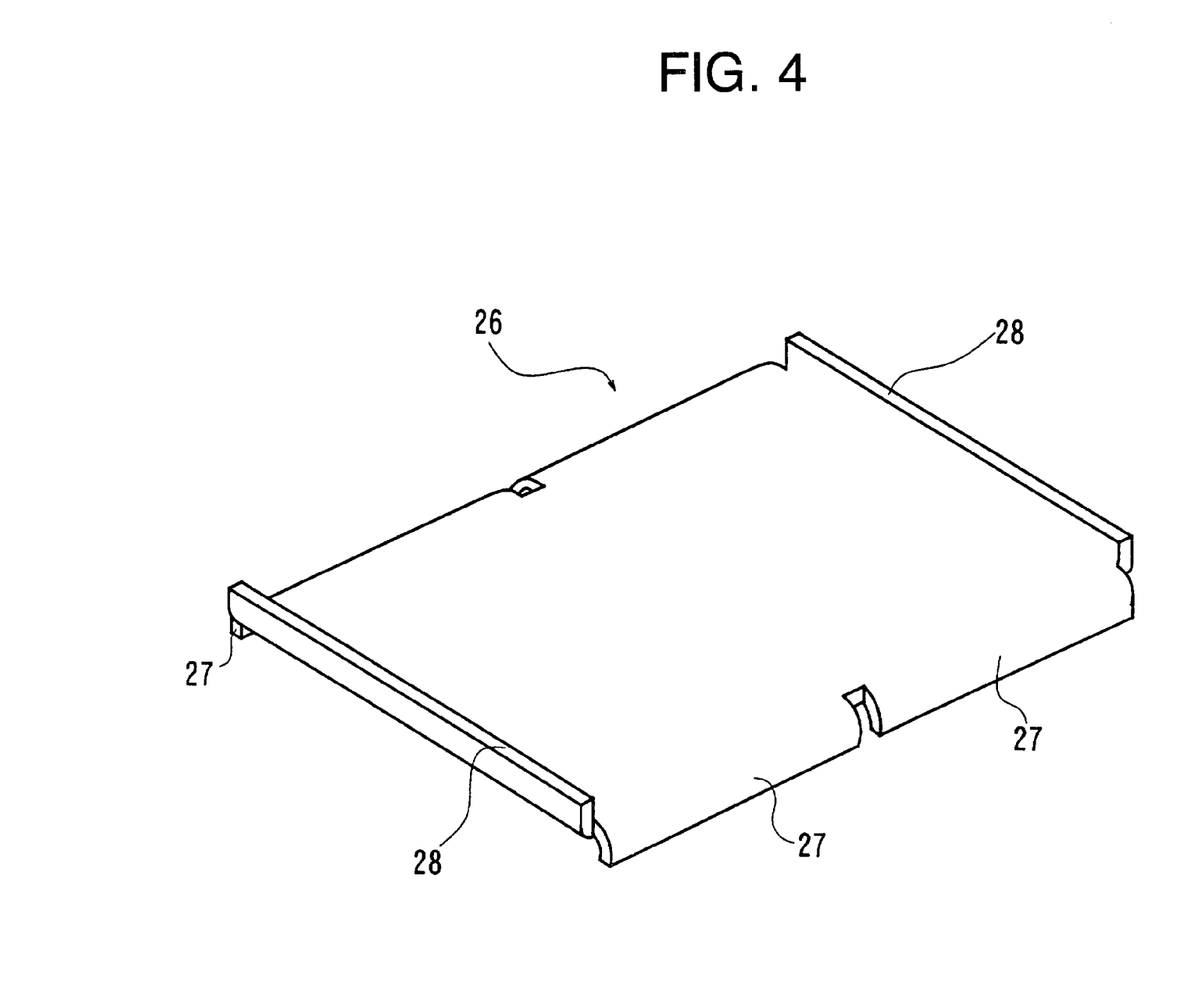
FIG. 4 is a perspective view of a cover plate according to the embodiment of the present invention.

A cover plate 26 is arranged to overpass the dams 17, 18. As shown in FIG. 4, the cover plate 26 provides a pair of first guide portions 27 and a pair of second guide portions 28. The first guide portions 27 are formed at the right and left ends of the cover plate 26 so as to extend downwardly. The second guide portions 28 are formed at the front and rear ends of the cover plate 26 so as to extend upwardly. The battery 7 is installed on the cover plate 26. The battery 7 includes a plurality of cells in its casing 7a, and provides a drain port 7b, which is bored through the battery casing 7a.

The operation of the present embodiment will now be described. When the battery fluid boils upon charging the battery 7, which is installed to the battery-powered forklift truck, and when the battery fluid overflows onto the bottom of the battery casing 7a out of the cell, the battery fluid flows onto the cover plate 26 through the drain port 7b, which is bored through the bottom of the battery casing 7a. The battery fluid flowed on the cover plate 26 flows in a direction in accordance with the inclination of the body 3 at the moment. The battery fluid flowed in front and rear directions relative to the body 3 is retarded from flowing downwardly by the second guide portions 28 at the front and rear ends of the cover plate 26, and flows in right and left directions relative to the body 3 along the second guide portions 28. The battery fluid flowed along the cover plate 26 in the right and left directions relative to the body 3 passes by the first guide portions 27 at the right and left ends of the cover plate 26, and flows onto the side frames 12, 13. The battery fluid flowed on the side frames 12, 13 is retarded from flowing into the inside of the body 3 by the dams 17, 18, and flows toward the outside of the side frames 12, 13 until the troughs 21 receive the flowed battery fluid. The battery fluid flowed onto the troughs 21 also flows in the front and rear directions in accordance with the inclination of the forklift truck at the moment, and flows into the tire housings out of the front and rear ends of the troughs 21, thus draining the leaked battery fluid outside the body 3.

According to the present embodiment, the following advantageous effects are obtained.
(1) Since the leaked battery fluid is retarded from flowing into the inside of the body, the instruments 30 installed between the side frames are not damaged.
(2) Since the battery fluid flowed along the side frames toward the right and left directions relative to the body is received by the troughs, and since the battery fluid is drained to the tire housings out of the front and rear ends of the troughs, no battery fluid leaks onto the surface of the body. Thereby, no worker is hindered upon working.
(3) Since a plate, on which the battery installed, is used as a dam plate, no new component is required, and does not cause cost to increase.

The present invention is not limited to the embodiment described above, but may be modified into the following examples.

In the present embodiment, the battery 7 is arranged on the cover plate 26, however. The battery 7 may be arranged above the cover plate 26 by using a bracket.

The operation upon the leakage of the battery fluid is described above. However, when distilled water overflows upon supplying water, electrical instruments, which are easily damaged by water, are protected by the similar structure described above.

The operation upon the leakage of the battery fluid is described above. However, when the battery fluid leaks due to vibration upon moving the vehicle or due to damage of the cell, the similar advantageous effects are obtained.

In the present embodiment, the pair of dams is formed by welding the square bars to the cover plate. However, the dam may be unified with the side frames by pressing.

According to the present invention described above, since the leaked battery fluid is retarded from flowing into the inside of the body, and since the leaked battery fluid is efficiently guided toward the outside of the body, the instruments installed between the side frames are inhibited from being damaged.

Therefore, the present examples and embodiments are to be considered as illustrative and not restrictive and the invention is not to be limited to the details given herein, but may be modified within the scope of the appended claims.

What is claimed is:

1. A battery-powered vehicle comprising:
   a pair of side frames;
   a cross plate interconnecting the side frames;
   a dam provided on each of the side frames;
   a cover plate arranged to overpass the dams;
   a battery installed on the cover plate or above the cover plate and a trough provided for a part of each of the side frames.

2. The battery-powered vehicle according to claim 1, wherein the trough is a semi-covered trough.

3. The battery-powered vehicle according to claim 1, wherein the trough is an open trough.

4. The battery-powered vehicle according to claim 1, wherein the trough is arranged at each of the right and left ends of the side frames.

5. The battery-powered vehicle according to claim 1, wherein the trough extends in a direction in which the side frames extend.

6. The battery powered vehicle according to claim 1, further comprising:
   tire housings provided for the vehicle;
   wherein each of the ends of the troughs extends to the tire housings.

7. The battery powered vehicle according to claim 6, wherein each of the ends of the troughs opens to the respective tire housing.

8. A battery-powered vehicle having a pair of side frames interconnected by a cross plate, instruments accommodated between the side frames, and a battery installed above the side frames, the vehicle comprising:
   a dam provided on each of the side frames; and
   a cover plate arranged to overpass the dams, the cover plate supporting the battery, wherein the dams are square bars.

9. The battery-powered vehicle according to claim 8 further comprising:
   a trough arranged at each of the right and left ends of side peripheries along a direction in which the side frames extend.

10. The battery-powered vehicle according to claim 9 further comprising:
    tire housings provided for the vehicle;
    wherein each of the ends of the troughs extends to the respective tire housing.

11. The battery-powered vehicle according to claim 10, wherein each of the ends of the troughs opens to the respective tire housing.

12. A battery-powered vehicle comprising:
    a pair of side frames;
    a cross plate interconnecting the side frames;
    a dam provided on each of the side frames;
    a cover plate provided on each of the side frames;
    a battery installed on the cover plate or above the cover plate, wherein the cover plate includes guide portions extending upward, whereby fluid is guided toward the right and left sides of the vehicle at the front and rear ends of the cover plate.

13. The battery-powered vehicle according to claim 12, wherein the fluid is battery fluid.

14. A battery-powered vehicle comprising:
a pair of side frames;
a cross plate interconnecting the side frames;
a dam provided on each of the side frames;
a cover plate arranged to overpass the dams;
a battery installed on the cover plate or above the cover plate, wherein the dams are square bars.

15. The battery-powered vehicle according to claim 14, wherein the dams extend in a direction in which the side frames extend.

16. The battery-powered vehicle according to claim 14, wherein the battery includes a casing that forms a drain port at its bottom.

17. The battery-powered vehicle according to claim 14, wherein the cover plate includes guide portions extending downward, whereby fluid is guided onto the side frames at the right and left ends of the cover plate.

18. The battery-powered vehicle according claim 17, wherein the fluid is battery fluid.

19. The battery-powered vehicle according to claim 14, wherein the dams are unified with the side frames.

* * * * *

UNITED STATES PATENT AND TRADEMARK OFFICE
CERTIFICATE OF CORRECTION

PATENT NO.     : 6,973,986 B2
DATED          : December 13, 2005
INVENTOR(S)    : Takashi Murase It is certified that error appears in the above-identified patent and that said Letters Patent is hereby corrected as shown below:

<u>Column 6,</u>
Line 9, change "according claim" to read -- according to claim --.

Signed and Sealed this

Sixteenth Day of May, 2006

JON W. DUDAS
*Director of the United States Patent and Trademark Office*